US009380773B2

(12) United States Patent
Hebbert et al.

(10) Patent No.: US 9,380,773 B2
(45) Date of Patent: Jul. 5, 2016

(54) GEAR FLOW DIVIDER FOR AGRICULTURAL PRODUCT INJECTION

(71) Applicant: Raven Industries, Inc., Sioux Falls, SD (US)

(72) Inventors: Amanda Marie Hebbert, Huron, SD (US); Michael Jordan Sukalski, Fairmont, MN (US); Colin James Taylor, Estelline, SD (US); Jaclyn Marie Clark, Sioux City, IA (US); Nicholas O. Michael, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 14/220,462

(22) Filed: Mar. 20, 2014

(65) Prior Publication Data

US 2014/0284400 A1    Sep. 25, 2014

Related U.S. Application Data

(60) Provisional application No. 61/803,942, filed on Mar. 21, 2013.

(51) Int. Cl.
    *B05B 1/20*      (2006.01)
    *A01M 7/00*     (2006.01)
    *A01C 23/00*    (2006.01)
    *A01C 23/04*    (2006.01)

(52) U.S. Cl.
    CPC ............ *A01M 7/0092* (2013.01); *A01M 7/006* (2013.01); *A01C 23/008* (2013.01); *A01C 23/04* (2013.01)

(58) Field of Classification Search
    CPC ............ A01M 7/0078; A01M 7/0075; A01M 7/0071; A01C 23/042
    USPC ................... 239/159, 726, 727, 407, 413, 406
    See application file for complete search history.

(56) References Cited

U.S. PATENT DOCUMENTS

| 4,015,366 | A | * | 4/1977 | Hall, III ........................ 47/1.43 |
| 5,337,959 | A |   | 8/1994 | Boyd |
| 5,704,546 | A |   | 1/1998 | Henderson et al. |
| 5,772,114 | A |   | 6/1998 | Hunter |
| 5,884,224 | A |   | 3/1999 | McNabb et al. |
| 5,913,915 | A |   | 6/1999 | McQuinn |
| 5,919,242 | A |   | 7/1999 | Greatline et al. |
| 5,971,294 | A |   | 10/1999 | Thompson et al. |
| 5,978,723 | A |   | 11/1999 | Hale et al. |
| 6,070,538 | A |   | 6/2000 | Flamme et al. |
| 6,070,539 | A |   | 6/2000 | Flamme et al. |
| 6,079,340 | A |   | 6/2000 | Flamme et al. |
| 6,122,581 | A |   | 9/2000 | McQuinn |
| 6,189,807 | B1 |  | 2/2001 | Miller et al. |
| 6,199,000 | B1 |  | 3/2001 | Keller et al. |

(Continued)

*Primary Examiner* — Davis Hwu
(74) *Attorney, Agent, or Firm* — Schwegman Lundberg & Woessner, P.A.

(57) ABSTRACT

This application discusses, among other things, agricultural equipment and more particularly agricultural chemical applicators. In an example, an agricultural sprayer system can include a first boom section configured to receive a carrier material and a chemical material and to provide an agricultural chemical mixture, the boom section having a plurality of nozzles for spraying the chemical mixture; and a first rod insert coupled to an end cap of the boom section, the rod insert configured to reduce the volume of the boom section and to provide increased flow velocity of the chemical mixture to each of the plurality of nozzles.

12 Claims, 1 Drawing Sheet

(56) References Cited

U.S. PATENT DOCUMENTS

| | | |
|---|---|---|
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,522,948 B1 | 2/2003 | Benneweis |
| 6,606,542 B2 | 8/2003 | Hauwiller et al. |
| 6,678,580 B2 | 1/2004 | Benneweis |
| 6,698,368 B2 | 3/2004 | Cresswell |
| 6,708,080 B2 | 3/2004 | Benneweis |
| 6,776,355 B2 | 8/2004 | Ringer et al. |
| 6,820,828 B1 * | 11/2004 | Greenwalt .................... 239/726 |
| 6,877,675 B2 | 4/2005 | Benneweis |
| 7,395,769 B2 | 7/2008 | Jensen |
| 7,690,440 B2 | 4/2010 | Dean et al. |
| 7,694,638 B1 | 4/2010 | Riewerts et al. |
| 7,706,926 B2 | 4/2010 | Peterson |
| 7,848,865 B2 | 12/2010 | Di Federico et al. |
| 8,141,504 B2 | 3/2012 | Dean et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,488,874 B2 | 7/2013 | Zaman et al. |
| 8,635,963 B2 | 1/2014 | Friggstad |
| 2002/0107609 A1 | 8/2002 | Benneweis |
| 2003/0070597 A1 | 4/2003 | Cresswell |
| 2010/0101469 A1 | 4/2010 | Landphair et al. |
| 2011/0054743 A1 | 3/2011 | Kocer et al. |
| 2011/0179984 A1 | 7/2011 | Beaujot et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |

* cited by examiner

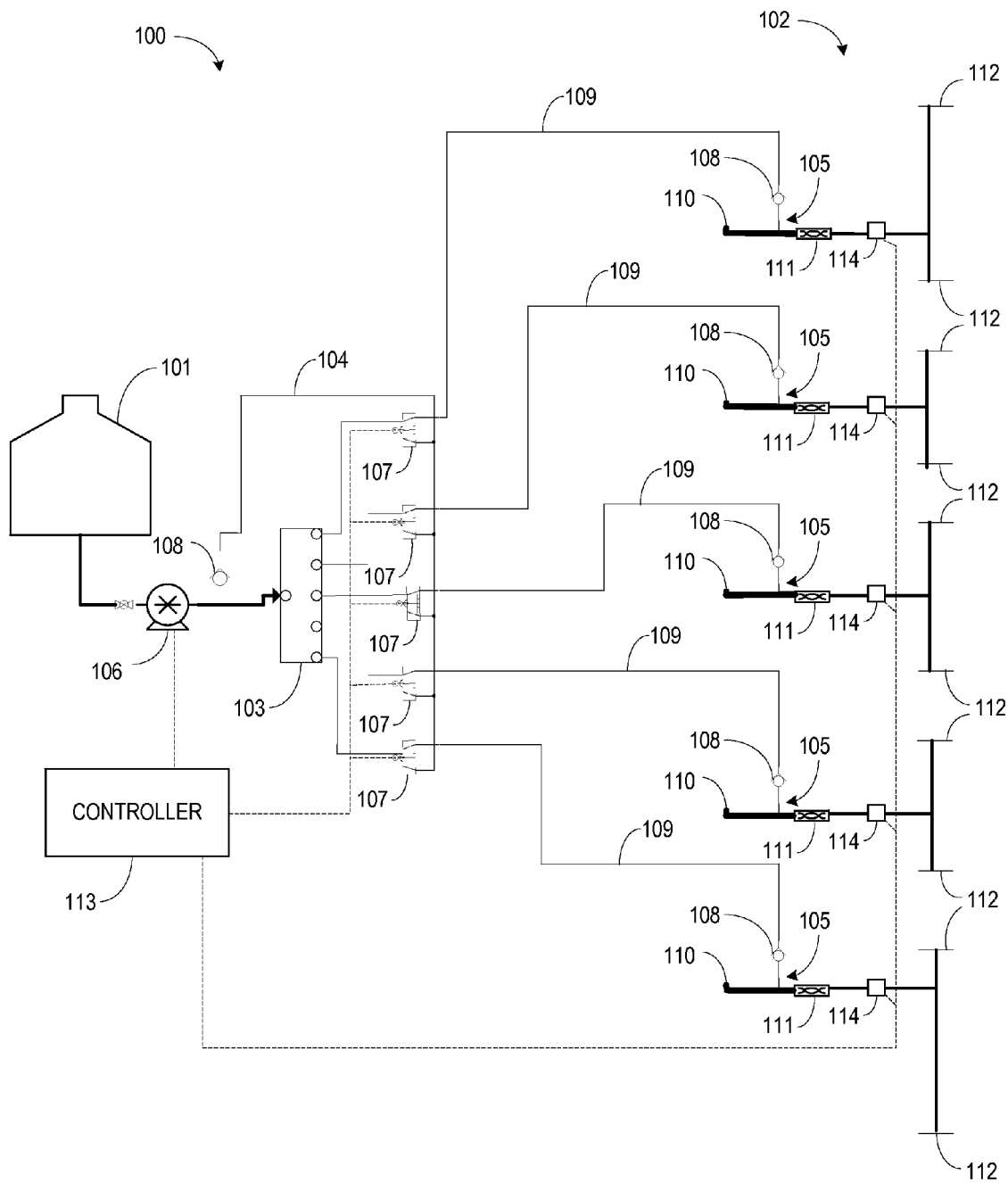

GEAR FLOW DIVIDER FOR AGRICULTURAL PRODUCT INJECTION

CLAIM OF PRIORITY

This application claims the benefit of priority under 35 U.S.C. 119 to Hebbert et al., U.S. Provisional Patent Application No. 61/803,942, entitled, "GEAR FLOW DIVIDER FOR AGRICULTURAL PRODUCT INJECTION," filed Mar. 21, 2013, which is hereby incorporated by reference herein in its entirety.

OVERVIEW

This application discusses, among other things, agricultural equipment and more particularly agricultural chemical applicators. In an example, an agricultural sprayer system can include a first boom section configured to receive a carrier material and a chemical material and to provide an agricultural chemical mixture, the boom section having a plurality of nozzles for spraying the chemical mixture; and a first rod insert coupled to an end cap of the boom section, the rod insert configured to reduce the volume of the boom section and to provide increased flow velocity of the chemical mixture to each of the plurality of nozzles.

This overview is intended to provide a general overview of subject matter of the present patent application. It is not intended to provide an exclusive or exhaustive explanation of the invention. The detailed description is included to provide further information about the present patent application.

BRIEF DESCRIPTION OF THE DRAWINGS

The drawings illustrate generally, by way of example, but not by way of limitation, various embodiments discussed in the present document.

FIG. 1 illustrates general an example sprayer system.

DETAILED DESCRIPTION

The present inventors have recognized apparatus and methods for improving chemical injection for sprayer applications, such as chemical injection for agricultural sprayers and sprayer systems. In certain examples, more precise application of injection chemicals can be achieved using the apparatus and methods discussed below. In some examples, an apparatus can include a gear flow divider and multiple injector locations for the injection chemicals, including injector locations at or near the sprayer nozzles. In some examples, an apparatus can include a rod insert that can be inserted in a boom and can decrease boom volume. Decreased boom volume can allow an increase in flow velocity and, therefore, a decrease in chemical injection latency and application latency.

FIG. 1 illustrates general an example sprayer system 100 including multiple sections, or boom sections 102, a flow divider 103, recirculation circuit 104 and multiple injectors 105. In certain examples, an injector 105 can be associated with a boom section 102 that includes one or more nozzles (not shown) for releasing or spraying a carrier material and an injection chemical. In certain examples, the sprayer system 100 can include a reservoir 101, such as a tank, to hold a supply of the injection chemical. In certain examples, the sprayer system 100 can include a pump 106 to draw the injection chemical from the reservoir 101 to the flow divider 103. The flow divider 103 can distribute an aggregate flow of the injection chemical to a number of injectors 105. In certain examples, the flow divider 103 can include a gear flow divider that can provide a continuous supply of the injection chemical to each injector 105 with little if any flow ripple. In some examples, the gear flow divider can include a stackable architecture to allow the sprayer system 100 to be reconfigured for more or less injectors or injector locations. In certain examples, the gear flow divider can include gear sizes having gear diameter and gear width dimensions that are configured to reduce wear while providing a wide range of flow without a ripple effect. In certain examples, the reduced wear can be achieved using gears designed to operate at low speeds.

In certain examples, portions of the spray system 100, such as individual sections or boom sections 102, can be enabled and disabled, for example, to minimize overlapping and wasting spray materials. In certain examples, the spray system 100 can include a recirculation valve 107 in each output circuit of the flow divider 103. In certain examples, when a boom section 102 is disabled, the recirculation valve 107 can be used to isolate the boom section 102 from the flow of the injection chemical and can simultaneously recirculate an injection chemical flow back to the input of the flow divider 103. In certain examples, the recirculation circuit 104 can include a check valve 108 to mitigate injection chemical flow bypassing the flow divider 103 through the recirculation circuit 104. In certain examples, a controller 113 can control the injection pump 106 and the recirculation valves 107. In some examples, each recirculation valve 107 can operate in conjunction with a section control valve 114 configured to enable and disable one or more boom sections 102 of the sprayer system 100. In certain examples, a recirculation valve 107 can include, but is not limited to, a 2-way, 3-port valve. In certain examples, the controller can adjust the speed of the injection pump 106 such that as boom sections 102 are enabled and disabled, the speed of the injection pump 106 can be adjusted to provide a proper aggregate flow of the injection chemical.

At or near each boom section 102, an injection flow line 109 can be coupled to a carrier flow line 110, at an injector 105 or an injector junction, to allow the injection chemical to be introduced with the flow of the carrier material. In certain examples, each boom section 102 can include a mixer, such as an inline mixer 111, after the injector 105 to mix the injector chemical and the carrier material prior to being released or sprayed at a nozzle of the boom section 102. In certain examples, a frame can include the sprayer system 100. In some examples, the frame can be configured to be towed over a field. In certain examples, the frame can include a drive train for moving the sprayer system 100 over a field. In some examples, the frame can include the sprayer system 100 and the carrier material distribution system (not shown). In some examples, the controller can receive application information such as an application map and position, speed and heading information of the sprayer system to control the sprayer system 100 according to application rates dictated by the application map.

In certain examples, a section or a section boom 102 can include a rod insert 112. A rod insert 112 can be configured to reduce injection latency by reducing the volume of a boom section 102 or a portion of a boom section 102. With reduced volume, flow of the carrier material and the injection chemical can be increased and thus reduce the time for the injection chemical to pass through the sprayer system 100. Such a reduction can assist in allowing the system to more precisely control the application of the injector chemical. In certain examples, use of injectors 105 located at the boom sections 102 and use of the rod inserts 112 can reduce injection latency up to about 75%.

Additional Notes and Examples

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An agricultural sprayer system comprising:
   a first boom section configured to receive an carrier material and a chemical material and to provide an agricultural chemical mixture including the carrier material and the chemical material, the boom section having a plurality of nozzles for spraying the chemical mixture;
   a first rod insert coupled to an end cap of the boom section and inserted within at least a portion of the boom section, the rod insert configured to reduce the volume of the boom section and to provide increased flow velocity of the chemical mixture to each of the plurality of nozzles;
   a first chemical flow line configured to deliver the chemical material to the first boom section;
   a first recirculation valve, the first recirculation valve configured to pass chemical material to the first chemical flow line in a first state and to interrupt the flow of chemical material to the first chemical flow line in a second state; and
   a recirculation circuit coupled to the first recirculation valve, wherein the first recirculation valve is configured to pass the chemical material to the recirculation line in the second state.

2. The system of claim 1, wherein the first boom section includes a first inline mixer to mix the carrier material with the chemical material using a flow of each of the chemical material and the carrier material.

3. The system of claim 1, including a first carrier flow line configured to deliver the carrier material to the first boom section.

4. The system of claim 1, including a first chemical check valve configured to prevent carrier material from entering a portion of the first chemical flow line.

5. The system of claim 1, including a recirculation check valve coupled to the recirculation circuit and configured to prevent chemical material back flow into a portion of the recirculation circuit.

6. The system of claim 1, including a flow divider configured to distribute an aggregate flow of the chemical material to a plurality of boom sections, the plurality of boom section including the first boom section.

7. The system of claim 6, wherein the aggregate flow is configured to receive a recirculation flow from the recirculation circuit.

8. The system of claim 1, including a reservoir to provide at least a portion of the aggregate flow of the chemical material.

9. The system of claim 8, including a pump configured to draw the chemical material from the reservoir to the flow divider.

10. The system of claim 9, including a plurality of section valves, wherein each section valve is associated with each boom section of the plurality of boom sections; and
    wherein each section valve of the plurality of section valves is configured to isolate an associated boom section from the flow of the carrier material and the flow of the chemical material in a first state of the section valve, and to pass the flow of the carrier material and the flow of the chemical material in a second state of the section valve.

11. The system of claim 10, including a controller configured to individually control each section valve of the plurality of section valves, to individually control each recirculation valve of a plurality of recirculation valves and to modulate the pump based on a total number of boom section in the plurality of boom sections and a number of section valves in the second state; and
    wherein the plurality of recirculation valves includes the first recirculation valve.

12. The system of claim 11, wherein the controller is configured to receive application information for a field and to control the plurality of section valves, the plurality of recirculation valves and the pump using the application information as the system is moved about a field; and
    wherein the application information can include position, speed and heading information of the system relative to the field and an application map of the field, wherein the application map can include application rates of the chemical material on the field.

* * * * *